United States Patent [19]
Donohue

[11] 3,989,148
[45] Nov. 2, 1976

[54] SIDE PANELS AND LOADING RAMP FOR PICKUP TRUCK
[76] Inventor: John R. Donohue, P.O. Box 94, Couderay, Wis. 54828
[22] Filed: Sept. 19, 1975
[21] Appl. No.: 615,110

[52] U.S. Cl. .................................. 214/85; 296/10; 296/36
[51] Int. Cl.² ....................................... B65G 67/02
[58] Field of Search ............ 214/85, 85.1; 296/1 A, 296/10, 36, 43; 119/82

[56] References Cited
UNITED STATES PATENTS
3,319,811  5/1967  Martin .................................. 214/85
3,763,827  10/1973  Burkart ............................. 214/85 X Primary Examiner—Robert G. Sheridan
Attorney, Agent, or Firm—Burd, Braddock & Bartz

[57] ABSTRACT

Two panel assemblies are separately mounted on the side walls of a pickup truck by means of integral legs which fit into stake pockets provided by the truck. When these panel assemblies are so mounted, cross bars join the top portions of opposing panel assemblies to provide additional vertical stability to the panel assemblies and to serve as a top carrier. When removed from the side walls and longitudinally joined together in a single plane, these panel assemblies are hooked into the rear of the bed of the truck and extend from the rear of the truck to provide a loading ramp to the bed of the truck.

7 Claims, 5 Drawing Figures

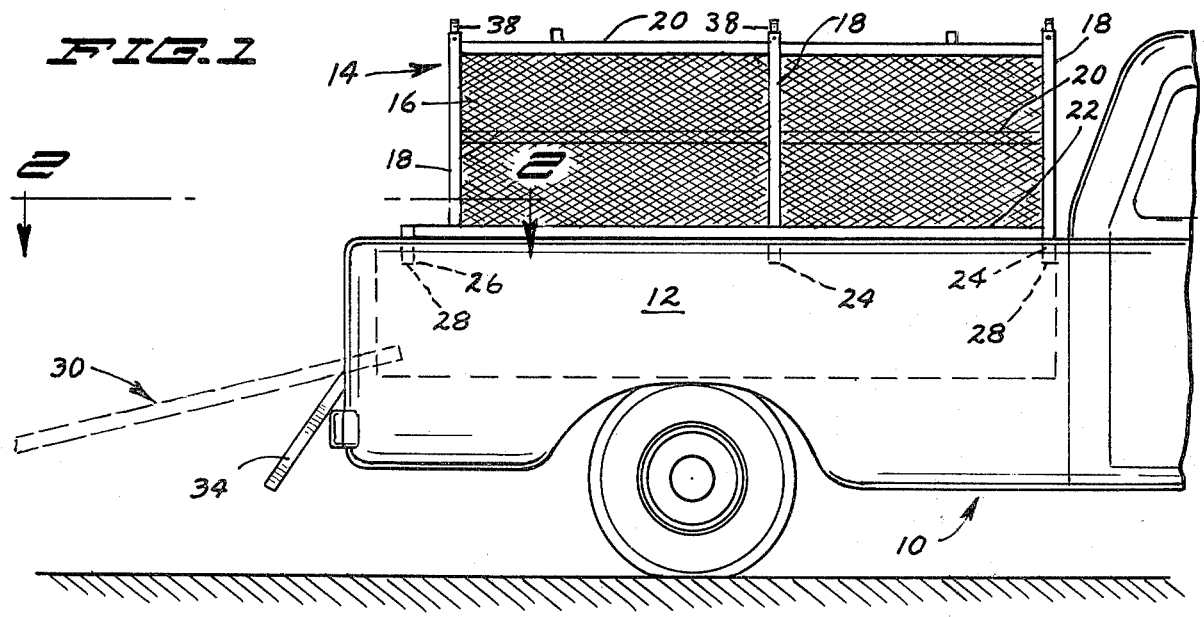
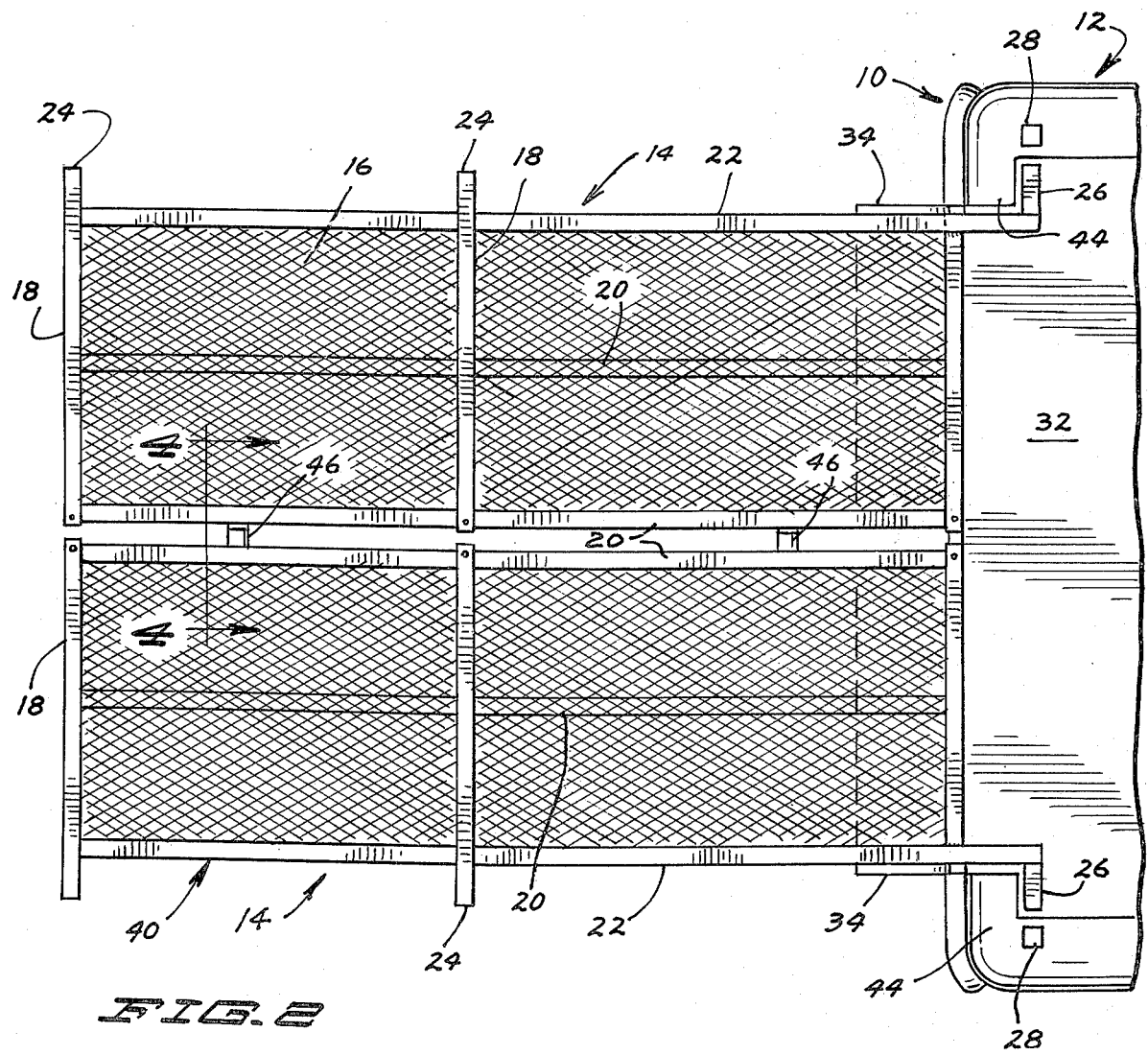

SIDE PANELS AND LOADING RAMP FOR PICKUP TRUCK

BACKGROUND OF THE INVENTION

The use of a ramp to facilitate the transfer of loads to and from the bed of a pickup truck or a like vehicle is well known. A principal problem that arises in connection with the use of these ramps is that of suitably storing such ramp while it is not in use. If the ramp is to be transported along with the load, it must occupy valuable load carrying space, either along the sides of the truck bed, see for example U.S. Pat. No. 3,737,058 granted to Johnson on June 15, 1973; or along the floor of the truck bed, see for example U.S. Pat. No. 3,613,920 granted to Flamm on Oct. 19, 1971. An additional problem has been that the ramps are totally useless while being transported.

There have been a number of attempts to provide for the use of loading ramps and yet minimize the loss of carrying space in the truck while the ramps are being transported. U.S. Pat. No. 3,642,156 granted to Stenson on Feb. 15, 1972, features a series of ramp sections which fold into one another in accordion-like fashion. The size of the ramp is limited in this arrangement, however; first by the fact that each succeeding section must be narrower than its predecessor, and secondly by the height of the tailgate itself. This problem is especially apparent where the load is heavy and a particularly long ramp is required to provide sufficient mechanical advantage. A similar limitation upon the size of the loading ramp is seen in U.S. Pat. No. 3,756,440 to Raap et al., granted on Sept. 4, 1973, where the length of the ramp would be strictly limited to the width of the pickup truck tailgate. Another ramp involving hinged sections is shown in U.S. Pat. No. 3,713,553 to Curtis et al., granted on Jan. 30, 1973. The Curtis invention significantly reduces the space used by the ramp in storage, but like the preceding two devices, it is also limited by the size of the tailgate. A further problem common to all ramps mounted on a tailgate is that the tailgate, rather than the truck bed, bears the weight of a load upon the ramp. This prevents the use of such a ramp for the loading of extremely heavy objects.

All of the above cited prior art devices occupy at least a portion of the usable carrying space of the truck in which they are being transported. In addition, they serve no useful purpose while in transport.

In transporting cargo loaded up a ramp and/or other cargo in an open pickup truck it is often highly desirable and sometimes necessary to provide at least temporary side walls on the truck.

BRIEF SUMMARY OF THE INVENTION

This invention relates to loading ramps for vehicles, such ramps being particularly well suited for use in trucks having flat beds, including trucks having relatively short side walls and tailgates surrounding such beds, and being provided with vertical stake pockets located in such side walls. The ramps are formed by several panel assemblies being temporarily connected to each other so that flat portions of all joined panel assemblies lie in substantially the same plane. In the form of the invention as shown, hooks and loops are used to join the panel assemblies.

Such ramps are supported on the rear of such beds when being used to load or unload cargo to and from the truck.

When the panel assemblies are not joined as part of the ramp, they are each mounted separately and directly upon one of the side walls of a truck, by means of legs which extend outwardly from the panel assemblies and are inserted vertically into the stake pockets provided along the side walls of the truck. In such mounted position, the panel assemblies extend upwardly, generally perpendicular to the truck bed to provide security and safety for loads transported on the truck bed.

Cross bars are positioned on top of the panel assemblies to extend transversely across the truck bed and to fixedly position the top of the panel assemblies with respect to each other, thus increasing the stability of these then vertical panel assemblies, and at the same time, providing structure which can serve as at least part of a top carrier.

Panel assemblies when so mounted not only perform a useful function but also do not occupy any of the carrying space on or above the truck bed. Rather they extend and enhance that space.

The panel assemblies of the invention, when used as a loading ramp, are particularly well suited to accomodate heavy loads. Superior load bearing strength results from the fact that hinges have been eliminated and that the truck bed, rather than the tailgate, is used to support the forward end of the ramp. Furthermore, the available mechanical advantage of the ramp, which depends upon the degree of incline and ultimately the length of the ramp itself, is maximized since the ramp can be as long as the truck bed.

BRIEF DESCRIPTION OF THE DRAWINGS

FIG. 1 is a side elevational view of one form of one of the panels of the invention shown mounted on a pickup truck;

FIG. 2 is a top plan view of the panels of the invention in loading ramp configuration attached to a rear end portion of a pickup truck;

BRIEF DESCRIPTION OF PREFERRED EMBODIMENT

Figure 3:
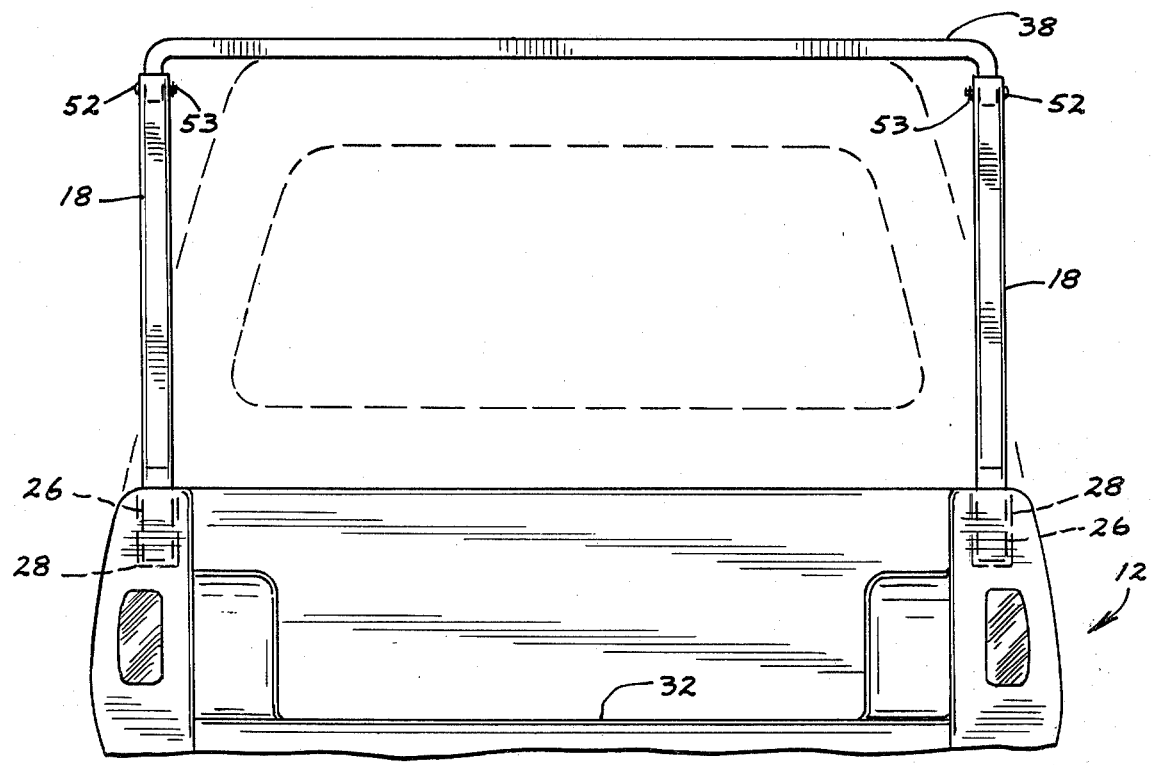
FIG. 3 is a rear elevational view of the panels of the invention shown mounted on the sides of a pickup truck.

Referring to the drawings, FIGS. 1, 2 and 3 show portions of a pickup truck 10 having side walls 12. Each of a pair of panel assemblies 14, 14 is mounted in one of two side walls 12, 12. As shown, each panel assembly 14 consists of a relatively flat panel 16 reinforced with transverse braces 18 and longitudinal braces 20, 20 and 22. Panel 16 may be expanded metal or other suitable material, while the braces are preferably constructed of rectangular metal tubing, or the like.

Each panel assembly 14 is provided with vertical side panel support stakes or legs 24, 24 and 26, each integrally connected to a longitudinal brace 22. Each such leg is positioned to be inserted into one of the stake pockets 28 provided by the side walls 12 of the pickup truck 10.

The dashed line at 30 in FIG. 1, indicates the position of panel assemblies 14 when used as a loading ramp. The ends of the panels including offset legs 26 are supported by a bed 32 of the pickup truck 10. Tailgate 34 is supported from the bed 32.

Figure 5:
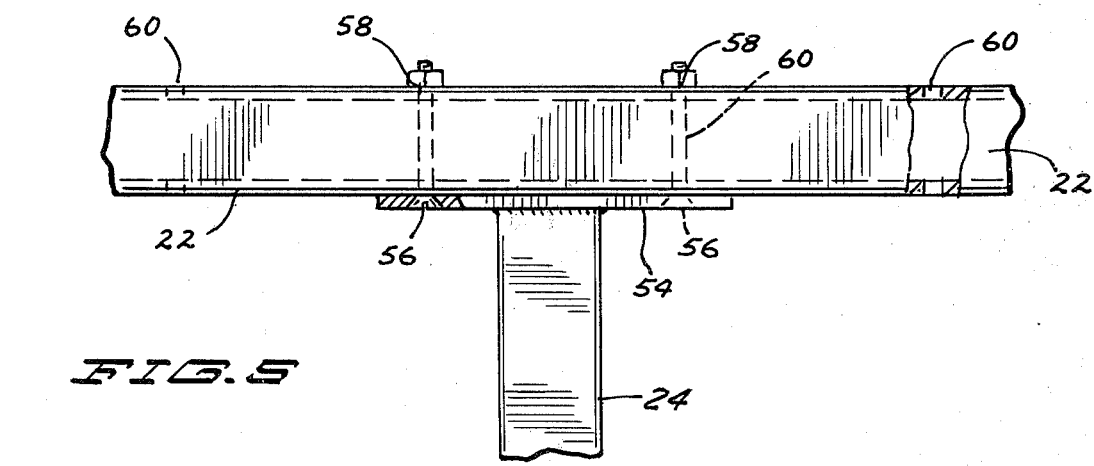
FIG. 5 is an enlarged side elevational view of a portion of one of the panels of the invention showing a leg mounted upon a longitudinal brace.

As best seen in FIG. 5, two side panel assemblies 14 are jointed by one or more cross bars 38 to add stability to the panels and to serve as a top carrier for canoes, boats and/or other luggage. Pins 52 extend through provided openings in the ends of the braces 18 and the bars 38 to temporarily hold them in place with respect to each other; and spring clips 53 retain these pins in such position until the cross bars 38 are to be removed.

Figure 4:
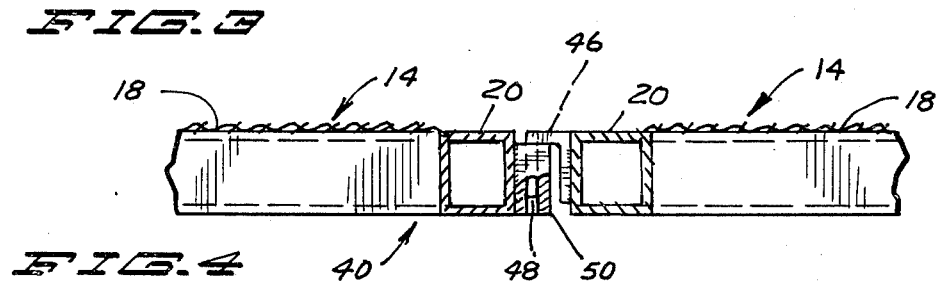
FIG. 4 is an enlarged view with parts in section and parts broken away taken on the line 4—4 of FIG. 2.

As seen in FIGS. 2 and 4, a loading ramp 40 comprises two panel assemblies 14, joined together as at 46 by a male hook 48 integral with one panel assembly 14 and a female loop 50 integral with the other.

Panels 16 provide a surface of proper texture and smoothness to facilitate the rolling or sliding of objects to and from bed 32 of the pickup truck 10. Ramp 40 is supported at a forward end by bed 32, and is supported at an opposite end by the ground, a platform, or other suitable load bearing surface. Legs 24, 24 and 26 extend outwardly from ramp 40 in a transverse direction. Offset legs 26 are restrained by inwardly extending side wall portions 44 of walls 12 to prevent longitudinal movement of the ramp 40 away from the pickup truck bed 32 during loading or unloading.

As seen in FIG. 4, two corresponding parallel, spaced apart longitudinal braces 20 each integrally carry at least one of said hooks 48 and loops 50. When assembled as loading ramp 40, these members are interfitted to hold the braces 20 and their associated panel assemblies 14 in fixed relation to each other.

A feature of the invention is its adaptability to various spacings of stake pockets 28. Thus side panel assemblies can be adapted to mounting on different sizes and brands of trucks, including not only various brands of pickup trucks but also flat stake bed trucks or trailers and similar vehicles as well.

A modified construction of brace 22 and leg 24 is shown in FIG. 5. A plate 54 integral with leg 24 abuts brace 22, and is integrally jointed to it by flat head screws 56 which pass through aligning apertures 60 provided in brace 22 and plate 54, the screws being secured by the tightening of nuts 58. Apertures 60 are drilled at various points along the brace, thus to accomodate various spacings of the stake pockets. Although one leg 24 is shown in FIG. 5, it is apparent that the preceeding method of adjustable mounting can be practiced upon as many legs 24, 24 and 26 as is necessary in order to provide the desired vertical support for the panel assemblies 14 in available stake pockets such as 28.

The embodiments of the invention in which an exclusive property or privilege is claimed are defined as follows:

1. In combination with a truck having a truck bed and provided with at least one upwardly opening panel support pocket at a side of said bed; side panel and loading ramp structure, said structure including;
    A. at least two panel assemblies;
    B. means for temporarily connecting said panel assemblies in fixed relation to each other to lie in substantially the same plane, said panels so connected forming a loading ramp;
    C. means for mounting a forward portion of said loading ramp at a rear portion of a truck and on a bed thereof, and for preventing longitudinal movement of said ramp away from said truck and said truck bed;
    D. means for mounting said panel assemblies along at least one side of said truck in at least one upwardly opening panel support pocket provided in the truck to temporarily fixedly position said assemblies along said side and substantially normal to an upper surface of said bed.

2. The structure of claim 1 wherein there are two rectangular panel assemblies having longitudinal and transverse edges; wherein said means for temporarily connecting said panel assemblies to form a loading ramp includes means for connecting longitudinal edges of said panel assemblies in parallel adjacent fixed relationship to each other; and wherein said means for mounting said panel assemblies along at least one side of said truck includes means for mounting one of each of said assemblies along opposite sides of the truck.

3. The structure of claim 2 wherein said panel assemblies include longitudinal and transverse braces defining said longitudinal and transverse edges; and wherein said means for temporarily connecting said panel assemblies in fixed relation to each other includes pairs of interlocking fasteners, one of each of said pairs being fixedly mounted to its associated longitudinal brace, said pairs of fasteners being formed and positioned to be temporarily positionable to hold said panel assemblies in fixed relation in a single plane and to be movable to position wherein said panel assemblies are not in fixed relationship to each other.

4. The structure of claim 2; a plurality of cross bars; and means to temporarily fasten each of said cross bars to a top longitudinal edge of each of said panel assemblies when said assemblies are mounted along opposite sides of said truck.

5. The structure of claim 2 wherein said means for mounting said panel assemblies along sides of said truck includes side panel support legs extending outwardly from and in fixed relation to each of said panel assemblies in the plane of its panel assembly and in the direction away from the longitudinal edge of its side panel assembly which is temporarily connected to the other assembly to form a loading ramp.

6. The structure of claim 5 wherein said means for mounting a forward portion of said loading ramp on the truck bed and for preventing longitudinal movement of said ramp away from the truck and truck bed includes the side panel support legs of each panel assembly located at the forward ends of said assemblies when connected to form said loading ramp.

7. The structure of claim 5 wherein said panel assemblies include longitudinal and transverse braces defining said longitudinal and transverse edges; and wherein said panel support legs are integrally supported on one of said longitudinal braces by temporary fastening means capable of positioning said legs along said braces to accommodate more than one set of spacings of panel support pockets.

* * * * *